United States Patent
Banerjee et al.

(10) Patent No.: US 12,254,255 B1
(45) Date of Patent: Mar. 18, 2025

(54) GLITCH IDENTIFICATION AND POWER ANALYSIS USING SIMULATION VECTORS

(71) Applicant: Synopsys, Inc., Sunnyvale, CA (US)

(72) Inventors: Joydeep Banerjee, Karnataka (IN); Mayur Bubna, Karnataka (IN); Debabrata Das Roy, Karnataka (IN); Solaiman Rahim, San Francisco, CA (US)

(73) Assignee: SYNOPSYS, INC., Sunnyvale, CA (US)

(*) Notice: Subject to any disclaimer, the term of this patent is extended or adjusted under 35 U.S.C. 154(b) by 389 days.

(21) Appl. No.: 17/837,954

(22) Filed: Jun. 10, 2022

(51) Int. Cl.
*G06F 30/3315* (2020.01)
*G06F 30/3312* (2020.01)
*G06F 119/06* (2020.01)
*G06F 119/12* (2020.01)

(52) U.S. Cl.
CPC ...... *G06F 30/3315* (2020.01); *G06F 30/3312* (2020.01); *G06F 2119/06* (2020.01); *G06F 2119/12* (2020.01)

(58) Field of Classification Search
USPC .......................... 716/100, 106, 136
See application file for complete search history.

(56) References Cited

U.S. PATENT DOCUMENTS

2014/0298049 A1* 10/2014 Cho .................... G06F 11/3062
713/502
2021/0279392 A1 9/2021 Banerjee et al.

\* cited by examiner

*Primary Examiner* — Bryce M Aisaka
(74) *Attorney, Agent, or Firm* — Womble Bond Dickinson (US) LLP

(57) ABSTRACT

A method includes: receiving a simulation vector associated with a circuit design, wherein the simulation vector is associated with a simulation vector type; identifying, by a processor, a plurality of glitch transitions from among one or more transitions associated with a pin of a cell of the circuit design during a clock period of the simulation vector, and determining a glitch power consumption of the cell during the clock period based on the plurality of glitch transitions.

20 Claims, 10 Drawing Sheets

GLITCH IDENTIFICATION AND POWER ANALYSIS USING SIMULATION VECTORS

TECHNICAL FIELD

The present disclosure relates to an electronic design automation (EDA) system, in particular, to a system and method for providing glitch identification and power analysis of an integrated circuit design based on register-transfer level (RTL) and gate-level simulation vectors.

BACKGROUND

Generally, digital integrated circuits (ICs) use a synchronous design in which a clock signal is used to coordinate the operation of the circuit elements within the integrated circuit. A clock signal oscillates between a logic high state and a logic low state (e.g., a high voltage and a low voltage), and various circuit elements or sub-circuits, such as digital logic gates (e.g., AND, OR, XOR, and NOT gates) become active either at the rising edge (from the low state to the high state), falling edge (from the high state to the low state), or both edges of the clock signals for synchronization. A particular circuit element or sub-circuit may generate output signals that fluctuate between high state and the low state before reaching a steady state, where the steady state is read as the input of a downstream circuit element at the next clock signal (e.g., next rising edge or next falling edge of the clock signal). These fluctuations in state before reaching the steady state are referred to as glitches. Power consumed by glitches is referred to as glitch power, and glitch power can make up a significant percentage of the total power consumed by an integrated circuit.

SUMMARY

According to one embodiment of the present disclosure, a method includes: receiving a simulation vector associated with a circuit design, wherein the simulation vector is associated with a simulation vector type; identifying, by a processor, a plurality of glitch transitions from among one or more transitions associated with a pin of a cell of the circuit design during a clock period of the simulation vector; and determining a glitch power consumption of the cell during the clock period based on the plurality of glitch transitions.

The identifying the plurality of glitch transitions may include: determining that the one or more transitions associated with the pin of the cell includes the plurality of glitch transitions when a count of the one or more transitions is greater than 1; identifying all of the one or more transitions as the plurality of glitch transitions when the count of the one or more transitions is even; and identifying all but a last transition as the plurality of glitch transitions when the count of the one or more transitions is odd.

The method may further include categorizing the plurality of glitch transitions by: selecting a pair of adjacent glitch transitions from among the plurality of glitch transitions in order of timestamp; computing a pulse width based on a difference between timestamps of the pair of adjacent glitch transitions; categorizing a glitch associated with the pair of adjacent glitch transitions as a transport glitch when the pulse width is greater than or equal to an average slew of the cell; and categorizing the glitch associated with the pair of adjacent glitch transitions as an inertial glitch when the pulse width is less than the average slew of the cell.

The computing the glitch power consumption may include computing a glitch power of the inertial glitch by derating a power associated with a regular transition of the cell by a glitch scaling ratio computed in accordance with squaring a quotient of the pulse width divided by the average slew of the cell.

The simulation vector type may be a zero-delay simulation vector, and the method may further include: performing a timing update to determine timing information for the circuit design, where the timing information includes a signal delay associated with a cell of the circuit design; and shifting a plurality of signals of the simulation vector based on the timing information to simulate delays in the plurality of signals of the simulation vector.

The shifting the signals of the simulation vector may include propagating a glitch through the simulation vector based on an arc delay associated with the cell of the circuit design.

The method may further include identifying a clock domain of the cell and a domain clock signal associated with the clock domain from among a plurality of signals of the simulation vector, and determining the clock period based on the domain clock signal.

According to one embodiment of the present disclosure, a system includes: a memory storing instructions; and a processor, coupled with the memory and to execute the instructions, the instructions when executed cause the processor to: receive a simulation vector associated with a circuit design, the simulation vector being generated by a simulator simulating the circuit design; receive static timing analysis (STA) timing information of the circuit design; shift a plurality of signals of the simulation vector based on the STA timing information; identify a plurality of glitch transitions from among one or more transitions associated with a pin of a cell of the circuit design during a clock period of the simulation vector; and compute a glitch power consumption of the cell during the clock period based on the plurality of glitch transitions.

The instructions may further include instructions that, when executed, cause the processor to identify the plurality of glitch transitions by: determining that the one or more transitions associated with the pin of the cell includes the plurality of glitch transitions when a count of the one or more transitions is greater than 1; identifying all of the one or more transitions as the plurality of glitch transitions when the count of the one or more transitions is even; and identifying all but a last transition as the plurality of glitch transitions when the count of the one or more transitions is odd.

The instructions may further include instructions that, when executed, cause the processor to categorize the plurality of glitch transitions by: selecting a pair of adjacent glitch transitions from among the plurality of glitch transitions in order of timestamp; computing a pulse width based on a difference between timestamps of the pair of adjacent glitch transitions; categorizing a glitch associated with the pair of adjacent glitch transitions as a transport glitch when the pulse width is greater than or equal to an average slew of the cell; and categorizing the glitch associated with the pair of adjacent glitch transitions as an inertial glitch when the pulse width is less than the average slew of the cell.

The instructions may further include instructions that, when executed, cause the processor to compute a glitch power of the inertial glitch by derating a power associated with a regular transition of the cell by a glitch scaling ratio computed in accordance with squaring a quotient of the pulse width divided by the average slew of the cell.

The instructions to shift the plurality of signals of the simulation vector based on the STA timing information may include instructions that, when executed by the processor, cause the processor to propagate a glitch through the simulation vector based on the STA timing information.

The STA timing information may be received from a placement stage, a routing stage, or a signoff stage of a design flow of the circuit design.

The instructions may further include instructions that, when executed, cause the processor to generate feedback to a design flow of the circuit design as glitch-aware gate level switch activity interface format data or as glitch aware fast switching database format data.

According to one embodiment of the present disclosure, a non-transitory computer readable medium includes stored instructions, which when executed by a processor, cause the processor to: receive a simulation vector associated with a circuit design, wherein the simulation vector is associated with a simulation vector type; identify a plurality of glitch transitions from among one or more transitions associated with a pin of a cell of the circuit design during a clock period of the simulation vector; and determine a glitch power consumption of the cell during the clock period based on the plurality of glitch transitions.

The stored instructions may further include instructions, which when executed by the processor, cause the processor to identify the plurality of glitch transitions by: determining that the one or more transitions associated with the pin of the cell includes the plurality of glitch transitions when a count of the one or more transitions is greater than 1; identifying all of the one or more transitions as the plurality of glitch transitions when the count of the one or more transitions is even; and identifying all but a last transition as the plurality of glitch transitions when the count of the one or more transitions is odd.

The stored instructions may further include instructions, which when executed by the processor, cause the processor to categorize the plurality of glitch transitions by: selecting a pair of adjacent glitch transitions from among the plurality of glitch transitions in order of timestamp; computing a pulse width based on a difference between timestamps of the pair of adjacent glitch transitions; categorizing a glitch associated with the pair of adjacent glitch transitions as a transport glitch when the pulse width is greater than or equal to an average slew of the cell; and categorizing the glitch associated with the pair of adjacent glitch transitions as an inertial glitch when the pulse width is less than the average slew of the cell.

The stored instructions may further include instructions, which when executed by the processor, cause the processor to compute a glitch power of the inertial glitch by derating a power associated with a regular transition of the cell by a glitch scaling ratio computed in accordance with squaring a quotient of the pulse width divided by the average slew of the cell.

The stored instructions may further include instructions, which when executed by the processor, cause the processor to: determine the simulation vector type is a zero-delay simulation vector; perform a timing update to determine timing information for the circuit design, where the timing information includes a signal delay associated with a cell of the circuit design; and shift a plurality of signals of the simulation vector based on the timing information to simulate delays in the plurality of signals of the simulation vector.

The stored instructions may further include instructions, which when executed by the processor, cause the processor to generate feedback to a design flow of the circuit design as glitch-aware gate level switch activity interface format data or as glitch aware fast switching database format data.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
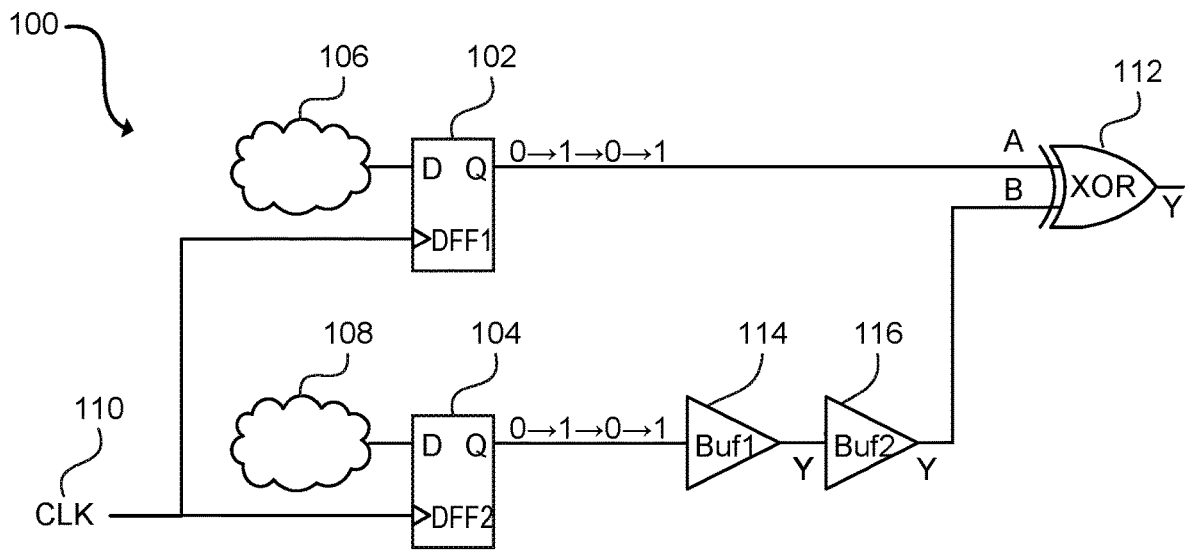
FIG. 1A is a circuit diagram of a sub-circuit of an integrated circuit design analyzed by in accordance with embodiments of the present disclosure.

Aspects of the present disclosure relate to glitch identification and power analysis using simulation vectors. The approaches described herein may be used by electronic design automation (EDA) software tools, implemented by a computer processor executing instructions, to perform power consumption analysis during circuit design development. The results of the power consumption analyses include estimates of power consumption, which may then be used to modify the IC design to improve power consumption characteristics (e.g., to lower power consumption) of the resulting integrated circuit (IC) devices.

Electronic design automation (EDA) software tools are used in the process of converting new electronic system ideas into corresponding IC devices using one or more IC "chips." Integrated circuit designers utilize EDA tools to develop an initial circuit design (a machine readable description of an IC device) to implement a new electronic system idea, to analyze and modify the initial circuit design in order to verify that the design performs the operational objectives set for the electronic system idea, and to generate and check a series of IC layouts (i.e., mask designs or mask layouts) that define a physical IC chip implementing the final circuit design. Modern IC devices, such as System-on-Chip (SoC) devices, can include billions of individual circuit components, and therefore there is no practical way to develop and produce modern IC devices without the use of EDA tools, especially as the complexity of new integrated circuit (IC) devices increases.

Many EDA software tools include sub-tools that estimate power consumption of a physical IC that is fabricated in accordance with the design. These estimates of power consumption may then be used to improve or optimize the power consumption characteristics of those circuit designs prior to fabrication (e.g., during the design process or during a pre-silicon phase). In particular, ICs are commonly designed for low power consumption by applying power constraints (e.g., target power consumption limits), where these power constraints are often given comparable weight as other design flow metrics (e.g., high-speed computation performance, small silicon area, and short time-to-market scheduling). These low-power IC typically target applications that demand low power consumption, such as to preserve battery life in mobile devices and to improve circuit reliability and costs associated with packaging and cooling solutions in both battery powered and grid-powered devices. Digital simulation tools help designers to estimate (predict) the power consumption of a post-fabrication (physical or post-silicon) IC device by simulating operation of the associated machine-readable circuit design in software or by emulating the operation of the circuit design in programmable hardware. The estimated power consumption data can be used to improve or optimize the circuit design to meet power consumption constraints before incurring the time delay and high cost of fabrication.

Some digital simulation tools for performing pre-silicon power consumption estimation for circuits use logic simulation software running on a computer processor or logic emulation software running on programmable hardware (e.g., a field programmable gate array or FPGA) along with a power calculator. Such circuit design simulation techniques cannot scale to operate on large and complex integrated circuit designs such as System-on-Chip (SoC) devices due to the high computation time and storage (e.g., computer memory) requirements for applying such techniques to large numbers of circuit elements (e.g., where the computation time and memory usage increases more than linearly with respect to the number of circuit elements).

To address this problem, the simulation tools provided in many of EDA software tools perform functional simulation processes (e.g., gate-level, standard delay format-annotated, or SDF-annotated, digital circuit simulations) that measure switching activity and provide data in the form of toggle count values. Each unit (toggle) of a toggle count represents a quantity of power consumed when a given cell undergoes a switching operation (e.g., changes its output state). The switching operation generates a signal edge or a signal pulse that is transmitted on a signal path to another cell. A total power consumption of the given cell can be determined using pre-measured power consumption amounts. For example, when the input signal to an inverter changes from logic low (e.g., 0 V) to logic high (e.g., 1 V), the inverter undergoes a switching operation to change its output from logic high to logic low. The inverter's toggle count is determined by detecting and counting the number of switching operations performed by the inverter during a power simulation session. The total power consumption of the inverter can then be calculated by multiplying the inverter's toggle count by a unit power consumption amount empirically determined by measuring the power consumption of fabricated inverters (e.g., real-world, physical hardware) having the same size and type of transistors. The total power consumption of a circuit design can then be estimated by generating a total toggle count including the switching operations of all cells (e.g., circuit elements) of the circuit design during a simulation period, and by multiplying the toggle count by corresponding unit power consumption amounts of the individual cells.

Digital simulator tools used to perform pre-silicon power consumption estimation are developed for IC devices fabricated using complementary metal oxide semiconductor (CMOS) and other fabrication technologies in the amount of power consumed by glitches accounted for a very small percentage of total power consumption. A glitch is an undesired transition (signal pulse of short duration) that occurs before a signal settles to its intended voltage level. Glitches may result from a fault or a design error. Glitches may also be caused when the input signals to the cell arrive at different times during a same clock cycle—e.g., in the presence of a race condition in a digital logic circuit. For example, a cell may be configured to output logic high when only one of its inputs are high (an XOR gate). If both of the inputs to the cell transition from low to high during a same clock cycle, a glitch can occur if there is a delay in the arrival of one of the two signals, such that the XOR gate briefly changes its output from logic low to logic high when the first signal transitions to logic high, but then settles to output a logic low value when the second signal transitions from logic low to logic high.

However, as fabrication technologies evolve, glitch power is becoming a significant factor in the total power consumption. In some designs, glitch power has accounted for nearly 50% of the total power consumption of the integrated circuit.

A circuit design typically includes two types of glitches: very short duration non-propagating glitches (inertial glitches (IG)) that are effectively canceled immediately after their generation; and longer duration functional glitches (or transport glitches (TG)) that propagate along the circuit paths like regular signal transitions. Inertial glitches do not fully transition from logic low to logic high (or vice versa) and back to the original state and therefore generally do not cause downstream cells to change their output states. On the other hand, transport glitches do fully transition between logic states and therefore these signal changes can cause downstream cells to change their output states. Ignoring all glitches when estimating power consumption results in underestimates, and considering non-propagating and functional glitches produces overestimates of power consumption Both of these scenarios result in circuit designs that may fail to meet power requirements or that may be overdesigned, resulting in increased total manufacturing costs and release schedule delays.

During the simulation of an integrated circuit design, input signals (e.g., sequences of logic high and logic low values) are supplied from a simulation test bench to input pins of the simulated integrated circuit, and simulation software running on a computer system simulates the propagation of those signals through the cells of the integrated circuit design, such as by simulating the outputs that a cell would generate at various times based on the inputs to those cells and propagating the changes in logic levels of various signals in the integrated circuit design. The sequences of value changes of the various signals in the integrated circuit design may be recorded during simulation and referred to as simulation vectors, e.g., as sequences of timestamped transitions between the different logic levels (e.g., transitions between logic low and logic high) for each of the signals in the integrated circuit design.

A simulation may be run based on an idealized model of the circuit where there is, for example, zero delay in the propagation of the signals between the cells and zero delay between the time at which a change appears at an input to a cell and the time at which the cell changes its output to be consistent with the change in input. Simulation vectors generated based on this idealized zero-delay simulation may be referred to as zero-delay simulation vectors, where all such logic level transitions will be aligned with clock signals in the circuit design.

On the other hand, a simulation may also be run in a manner that also accounts for delays in the propagation of signals through the connections between the cells and also accounts for delays between changes in the input signals to cells of the circuit and the appearance of a corresponding change in the outputs of those cells. In such simulations, many transitions will not be aligned with the clock signal, and signals may arrive at inputs to cells at different times within a clock cycle, thereby resulting in glitches. A simulation vector generated in accordance with such delay-aware simulation may be referred to as a delay-annotated simulation vector.

The present disclosure relates to techniques for accurately identifying glitch pulses from simulation vectors generated during the simulation of an integrated circuit design and for accurately estimating glitch power that would be consumed by an integrated circuit fabricated in accordance with the integrated circuit design. More specifically, the present disclosure relates to a method involving clock cycle-based glitch identification to detect glitch pulses from simulation vectors by identifying all transitions other than the last transition (the transition having the latest timestamp) within a clock period being associated with glitch pulses (e.g., all transitions on the pin during the clock period having timestamps earlier than the timestamp of the last transition). The simulation vectors supplied as input to power analysis according to the present disclosure may be stored as a register-transfer level (RTL) or gate-level simulation file (a value change dump or VCD file, a fast signal database or FSDB file, or the like) that captures all transitions, including both transport and inertial glitch pulses, in the simulated IC during the simulation. Some aspects of the present disclosure also relate to annotating a zero-delay simulation vector with (that is free of glitches) to insert glitches that are expected to exist, and then estimating glitch power based on the annotated simulation vector. Accordingly, by detecting glitch pulses directly from the simulation vectors, embodiments of the present disclosure compute an estimated glitch power by multiplying the glitch pulses by empirically derived power consumption values associated with those glitch pulses.

Technical advantages of the present disclosure include, but are not limited to, enabling IC designers to analyze glitches and glitch power consumption much earlier in the design process (i.e., using the RTL vectors and current static timing analysis or STA timing data), and may also be used during sign-off (using STA timing data for the finalized circuit).

Another advantage relates to a shorter turn-around time for performing a glitch power analysis by performing the glitch power analysis in only a single run of a power analysis tool while still providing comparably accurate results, as opposed to performing two separate runs in accordance with another technique as described above (a first power analysis run on a zero-delay simulation vector followed by a second power analysis run on a delay-annotated simulation vector) and computing the difference of two different runs of the power analysis tool. The shorter processing time for performing the glitch power analysis allows an IC engineer to, for example, perform additional iterations of power analysis and modification of the IC design to reduce glitch power, thereby resulting in IC designs that operate in a more power efficient manner and may also shorten the time to market for an IC design. Another technical advantage of the present disclosure relates to automatically categorizing design glitch power and instance level glitch toggles as transport glitches versus inertial glitches, thereby providing an IC designer with more accurate estimates of glitch power consumption as well as additional information for improving the IC design by reducing or removing glitch behavior. For example, some aspects relate to generating glitch-aware gate level switching activity interface format (SAIF) data, which may be used by place and route tools, for dynamic power optimization during the design flow of an integrated circuit, which provides feedback to an IC designer for modifying the placement of cells or modifying the routing of signals to reduce glitch power. Some embodiments of the disclosure also relate to generating glitch aware FSDB data, which may be used by rail power analysis tools to assist IC designers in detecting and fixing voltage drop (IR drop) violations in the design. Embodiments of the present disclosure may also generate gate-level glitch debug data for the signoff state and to generate glitch power waveforms, which may be useful for performing glitch aware engineering change order (ECO) operations to correct problems arising due to glitches.

In more detail, aspects of the present disclosure relate to performing power analysis based on an input simulation vector representing logic transitions (e.g., transitions between a logic low voltage and a logic high voltage), where the input simulation vector is recorded during a simulation of an integrated circuit design. As noted above, the input simulation vector may be a delay annotated gate level (GL) simulation vector or may be a register-transfer level (RTL) or zero-delay GL simulation vector.

A delay annotated GL simulation vector includes glitches that arise due to differences in timing of the arrival of signals, where these timing differences may arise due to delays caused by, for example, the lengths of the wiring paths taken by the signals passing between cells as well as switching delays associated with the transistors of the cells.

In contrast, an RTL simulation vector or zero-delay GL simulation vector is recorded from an idealized simulation that does not account for these delays and is therefore glitch-free. Performing an RTL simulation or zero-delay GL simulation is much less resource intensive than performing a simulation that accounts for these delays. In addition, an RTL simulation vector is also generally much smaller than a delay-annotated GL simulation vector because there generally are fewer logic level transition events in an RTL simulation vector than a delay annotated simulation vector (e.g., because transitions associated with glitches can make up a large fraction of the transition events in a delay-annotated GL simulation vector).

When a power analysis tool implemented in computer instructions executed by a computing device in accordance with the present disclosure is provided with a delay-annotated simulation vector, the power analysis process identifies transitions associated with glitches on a per-clock period basis by identifying extraneous transitions during that period. The extraneous transitions are then used to identify glitch pulses, which are categorized based on their length, and the power consumption of each glitch is then computed based on empirical data regarding the power consumed by individual glitches in accordance with the circuit elements (e.g., transistors) associated with the cell. Processes for identifying extraneous transitions, classifying glitch pulses, and calculating glitch power according to the present disclosure will be provided in more detail below.

In circumstances where the power analysis process is provided with an RTL simulation vector or zero-delay GL simulation vector, then it is assumed that there will be at most one transition for each signal during each clock period, in which case there will be no extraneous transitions. Accordingly, in these circumstances, a delay shifting tool implemented in computer instructions executed by a computing device generates glitch pulses on the outputs of the cells and marks these glitch pulses as glitches in order to distinguish these pulses from regular transitions. Processes for inserting glitches using a delay shifting tool according to the present disclosure will be described in more detail below. After generating the glitch pulses and adding these glitch pulses to the simulation vector, the modified simulation vector is analyzed in a manner similar to the approach outlined above with respect to a delay-annotated simulation vector.

To provide context, FIG. 1A is an example of a sub-circuit of an integrated circuit design analyzed in accordance with embodiments of the present disclosure. The example sub-circuit 100 of FIG. 1A includes a first D-flip-flop DFF1 102 and a second D-flip-flop DFF2 104. The data pin of the first D-flip-flop DFF1 102 is connected to a first portion of the integrated circuit design 106 and the data pin of the second D-flip-flop DFF2 104 is connected to a second portion of the integrated circuit design 108. Both the first D-flip-flop DFF1 102 and the second D-flip-flop DFF2 104 are clocked by a same clock CLK 110 corresponding to the clock domain of the sub-circuit 100. For the sake of the current example, it is assumed that both the first D-flip-flop DFF1 102 and the second D-flip-flop DFF2 104 generate the same outputs (e.g., alternating between 0 and 1 or logic low and logic high). The first D-flip-flop DFF1 102 has an output pin Q that is connected to an input pin XOR/A of an XOR gate 112. The second D-flip-flop DFF2 104 has an output pin Q that is also connected to an input pin XOR/B of the XOR gate 112, via a first buffer Buf1 114 and a second buffer Buf2 116 connected in series. The XOR gate 112 generates an output signal XOR/Y based on computing the exclusive-or (XOR) of its two inputs XOR/A and XOR/B.

In digital circuits, a glitch may be defined as a transition that occurs on a signal before the signal settles to its intended value. Glitches typically occur due to convergence in a logic cone of inputs to a cell, where the arrival of transitions in one branch of the logic cone arrive earlier than from another branch of the logic cone, thereby creating temporary unintended transitions at the output of the cell.

Glitch events may arise on combinational cell outputs due to input signals arriving at different times. For any combinational cell with more than multiple inputs, there may be multiple intermediate output transitions depending on the order in which the input events arrive. Glitches generated at a given point are propagated in the fanout logic from this given point with some filtering criteria (e.g., where some glitches may be so brief as to be filtered out by low pass behavior of the cells).

Figure 1B:
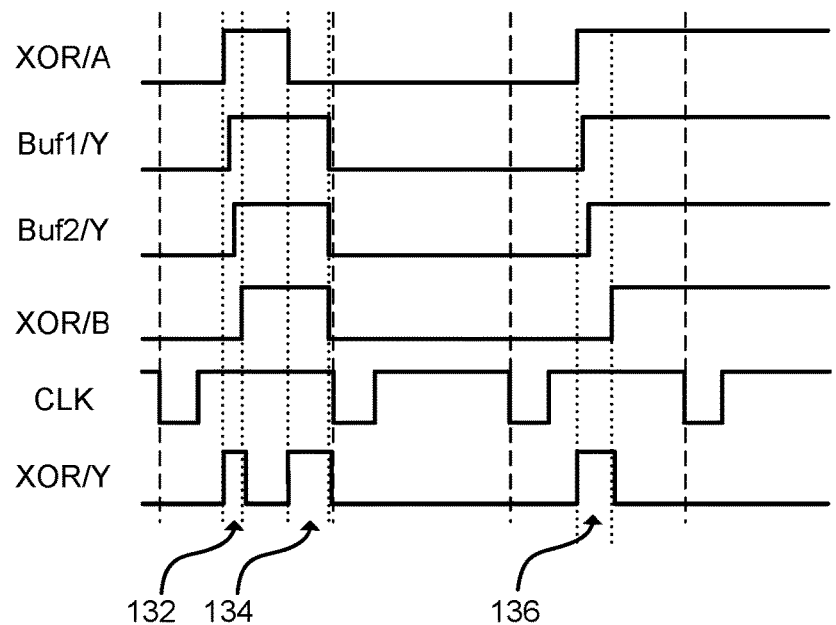
FIG. 1B is a waveform diagram showing the values of various signals during a simulation of the sub-circuit shown in FIG. 1A.

FIG. 1B is a waveform diagram showing the values of various signals during a simulation of the sub-circuit shown in FIG. 1A. The clock signal CLK generates a periodic falling edge, which may trigger the operation of the D-flip-flops DFF1 102 and DFF2 104. As seen in FIG. 1B, the first buffer Buf1 114 generates a delayed signal at output pin Buf1/Y and the second buffer Buf2 116 further delayed signal Buf2/Y due to the switching delays associated with the two buffers, such that the signal arriving at input pin XOR/B of the XOR gate 112 is delayed in comparison to the signal arriving at input pin XOR/A of the XOR gate 112. This difference in arrival times results in XOR/A and XOR/B briefly having different input values, such that the output XOR/Y of the XOR gate 112 becomes logic high in response, which is shown in FIG. 1B as an inertial glitch 132. Other timing differences between the signals supplied to input pins XOR/A and XOR/B of the XOR gate 112 may cause other glitches in the output XOR/Y, where these glitches may have longer duration and may therefore be classified as transport glitches 134 and 136. Note that, in an idealized case with zero delays, the buffers and the wiring would introduce no delays, and assuming the first D-flip-flop DFF1 102 and the second D-flip-flop DFF2 104 always produced the same outputs, the output XOR/Y of the XOR gate 112 would always remain at logic low because both of its inputs XOR/A and XOR/B would always match.

Glitches consume power and, as discussed above, glitch power can be signficant, ranging from 30-50% of the total power consumed by the design, especially in some technologies with low leakage current such as when using FinFET transistors. Because glitch power can make up a considerable percentage of the total power, it is important to take glitch power into account during power analysis when using zero-delay simulation vectors because ignoring glitch power would create an incomplete picture of the average and peak power consumption of the integrated circuit design.

One approach to simulating glitch power is for a simulation tool to generate additional pulses starting from an RTL test bench and to generate a gate-level (GL) simulation vector. However, when this GL simulation vector is read by a power analysis tool, there is no way for the power analysis tool to distinguish the regular transitions (e.g., intended transitions associated with the underlying logic of the integrated circuit design) from the glitch transitions (unintended transitions due, for example, to timing delays) because the transitions caused by the additional generated pulses are not labeled as glitches. As noted above, some approaches to dealing with this is to consider all transitions associated with pulses greater than a threshold length as regular transitions, and marking only those transitions associated with short duration pulses as glitch transitions. This has the effect of only considering inertial glitches (e.g., inertial glitch 132 shown in FIG. 1B) and ignoring transport glitches (e.g., longer glitches 134 and 136) when estimating the glitch power consumed by an integrated circuit design, based on the simulation vectors recorded during simulation of that integrated circuit design.

Figure 2:
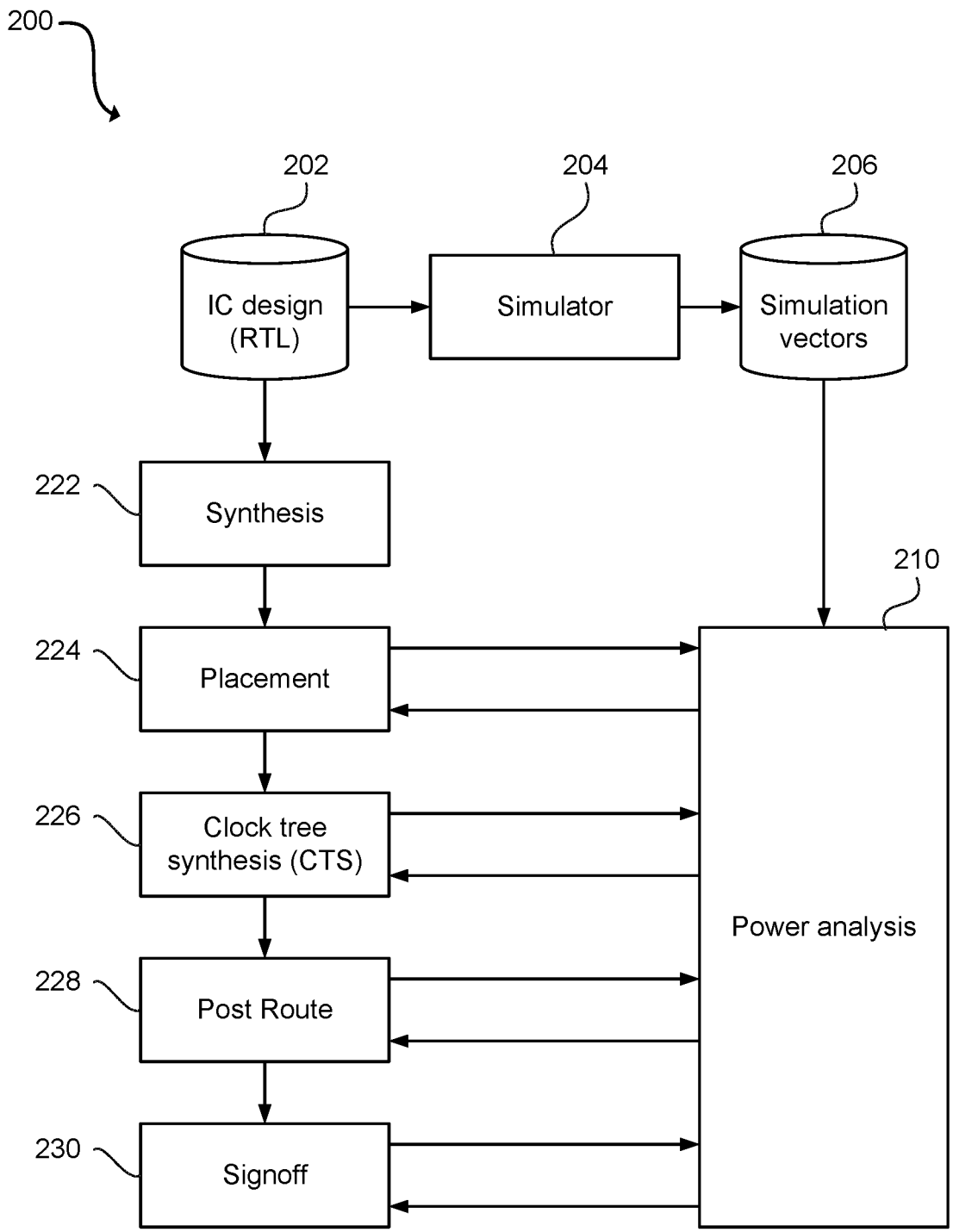
FIG. 2 is a flowchart depicting the role of power analysis in an integrated circuit design flow according to some embodiments of the present disclosure.

FIG. 2 is a flowchart depicting the role of power analysis in an integrated circuit design flow 200 according to some embodiments of the present disclosure. The design flow 200 shown in FIG. 2 relates to a process for progressing from a register-transfer level (RTL) design of an integrated circuit to a format representing an electronic pattern for controlling the manufacture of an integrated circuit. One common format for storing such electronic patterns is known as graphic design system 2 (GDSII), and therefore this flow may be referred to as an RTL-GDSII flow, but formats for representing such an electronic pattern are not limited to GDSII and may include other formats such as the Open Artwork System Interchange Standard (OASIS). The various portions of the design flow 200 may be implemented as computer instructions stored in a non-volatile computer readable medium and executed by one or more computer systems to implement the various portions of the workflow.

As shown in FIG. 2, an input integrated circuit (IC) design may be supplied as a register-transfer level (RTL) description, where the IC is modeled as a synchronous digital circuit in terms of the flow of digital signals between hardware registers and logical operations performed on those signals. The RTL IC design is provided to a simulator 204 implemented as computer instructions and executed by a computer system to generate simulation vectors 206, representing timestamped transitions between logic levels (logic low and logic high) of signals within the IC design 202 in response to specified inputs that are supplied to the IC design 202 from a simulation test bench controlled by the simulator. The simulation vectors 206 are then supplied as input to a power analysis tool 210, implemented as computer instructions stored on a computer readable medium and executed by a computing system, to perform power analysis, including calculating glitch power, as discussed in more detail below.

Still referring to the design flow 200, the IC design 202 is supplied to a synthesis stage 222, which transforms the IC design into a netlist, which may be a graph structure representing components of a circuit and the connections therebetween. During a placement stage 224, the individual components are converted into cells taken from a library of standard cells, where a cell may specify transistors and/or other components that implement the functionality of the cell (e.g., a logic gate such as AND or a storage cell such as a flip-flop or a latch), and where the cells are placed on a two-dimensional grid representing the layout of the integrated circuit. During a clock tree synthesis (CTS) stage 226, the computing device computes wiring paths for distributing clock signals throughout the integrated circuit, where different clock trees are synthesized for different clock signals.

The power analysis tool 210 performs updated power analyses at various stages of the design flow 200 in order to provide more accurate calculations of power analysis. For example, at the start of the design flow 200, the power analysis may be performed solely on zero-delay simulation vectors. At each stage of the design flow, such as after the placement stage 224, after the clock tree synthesis stage 226, and after the post routing stage 228, additional and more precise estimates of timing delays are available. For example, placement of the cells into a layout allows approximation of wire lengths between cells for calculating propagation delays and the selection of particular standard cells during placement allows for switching delays to be included when applying delay annotations to simulation vectors. Similarly, after a clock tree synthesis stage 226, timing delays (e.g., clock skew) associated with the clock signal are also available to be included when generating a delay annotated simulation vector.

By providing this updated delay information to the power analysis tool 210, the power analysis tool 210 can generate shifted versions of the simulation vectors that account for signal delays in the design, as will be described in more detail below. These updated shifted versions of the simulation vectors are, in turn, used by the power analysis tool 210 to compute more accurate power consumption estimates, including estimates of glitch power. In some embodiments, the power analysis tool 210 provides feedback by generating glitch-aware gate level switching activity interface format (SAIF) data (which may be used by place and route tools associated with placement and routing stages) for dynamic power optimization, which provides feedback to an IC designer regarding the power performance of the current iteration of the design and to, for example, modify the placement of cells or modify the routing of the clock tree as needed to reduce glitch power. In some embodiments, the power analysis tool 210 generates glitch aware FSDB data, where the glitch aware FSDB data may be used IC designers using power rail analysis tools to detect and fix voltage drop (IR drop) violations in the design. In some embodiments, a power analysis tool 210 of the present disclosure generates gate-level glitch debug data that is provided to the signoff stage 230 and generates glitch power waveforms, which may be useful for performing glitch aware engineering change order (ECO) operations to correct problems arising due to glitches.

Figure 3:
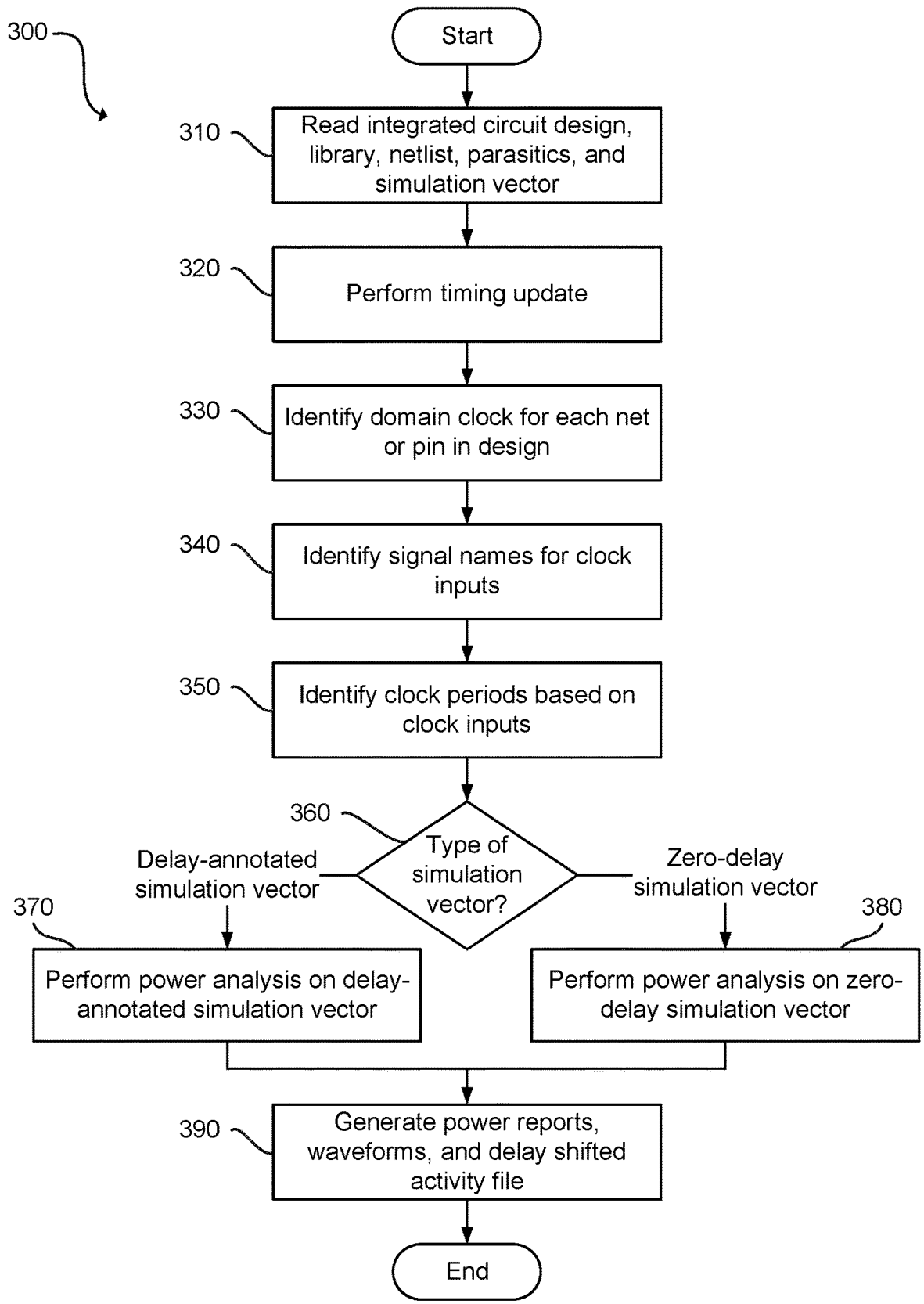
FIG. 3 is a flowchart illustrating a method for performing power analysis in accordance with some embodiments of the present disclosure.

FIG. 3 is a flowchart illustrating a method 300 for performing power analysis in accordance with some embodiments of the present disclosure. At 310, the power analysis tool 210 reads in an integrated circuit design (e.g., an RTL representation of an integrated circuit, which may be expressed in a hardware description language such as Verilog or VHDL), libraries of cells, design data, constraints (SDC), and parasitics, as well as a simulation vector generated through performing a simulation of the operation of the integrated circuit design. At 320, the power analysis tool performs a timing update to determine timing data (e.g., delays, slews) at each node of the circuit design.

At 330, the power analysis tool identifies a domain clock for each net or pin in the design. In more detail, each net or pin in the integrated circuit design may exist within a particular clock domain, where cells in the clock domain are driven by the same clock (the domain clock of the domain). This may be determined based on information associated with the particular instances of the cell within the computer-readable representation of the design (e.g., the netlist). At 340, the power analysis tool 210 identifies signal names associated with the clocks that drive the various clock domains in the integrated circuit design. At 350, the power analysis tool 210 identifies the clock periods based on the clock inputs (e.g., the length of each clock period and the timestamps of the beginnings and ends of these clock periods).

At 360, the power analysis tool 210 determines which type of simulation vector was provided as input to the power analysis tool 210 for performing power analysis. The simulation vector may be provided automatically by a simulator that has performed a simulation run or may be provided manually by the user. In some embodiments, the simulation vector is associated with metadata indicating whether the simulation run that generated the simulation vector was a zero-delay simulation or a delay-aware simulation, and the power analysis tool 210 makes the determination accordingly. In some circumstances, such as where the simulation vector is not specifically identifies as being a zero-delay simulation vector or a delay-aware simulation, the power analysis tool 210 automatically identifies one or more clock signals in the simulation vector (e.g., based on labels associated with the signals) and determines that the simulation vector is a zero-delay simulation vector when all (or substantially all) of the other signals in the simulation vector are aligned with one of the one or more clock signals, and determines that it is a delay-annotated simulation vector otherwise. In the case where the input was a delay-annotated simulation vector, then the power analysis tool 210 proceeds with performing power analysis based on this delay-annotated simulation vector at 370, and as will be described in more detail below with respect to FIG. 4. In the case where the input was a zero-delay simulation vector, then the power analysis tool 210 proceeds with performing power analysis based on the zero-delay simulation vector at 380, as described in more detail below with respect to FIG. 6.

At 390, the power analysis tool 210 takes the output of the power analysis performed at 370 or at 380, depending on the type of simulation vector that was provided as input, and generates outputs relating to the power analysis, such as power consumption reports, waveforms, and/or a delay shifted activity file, where these outputs are provided as feedback to a user (e.g., IC designer) at various stages in the design flow 200 described above with respect to FIG. 2.

Figure 4:
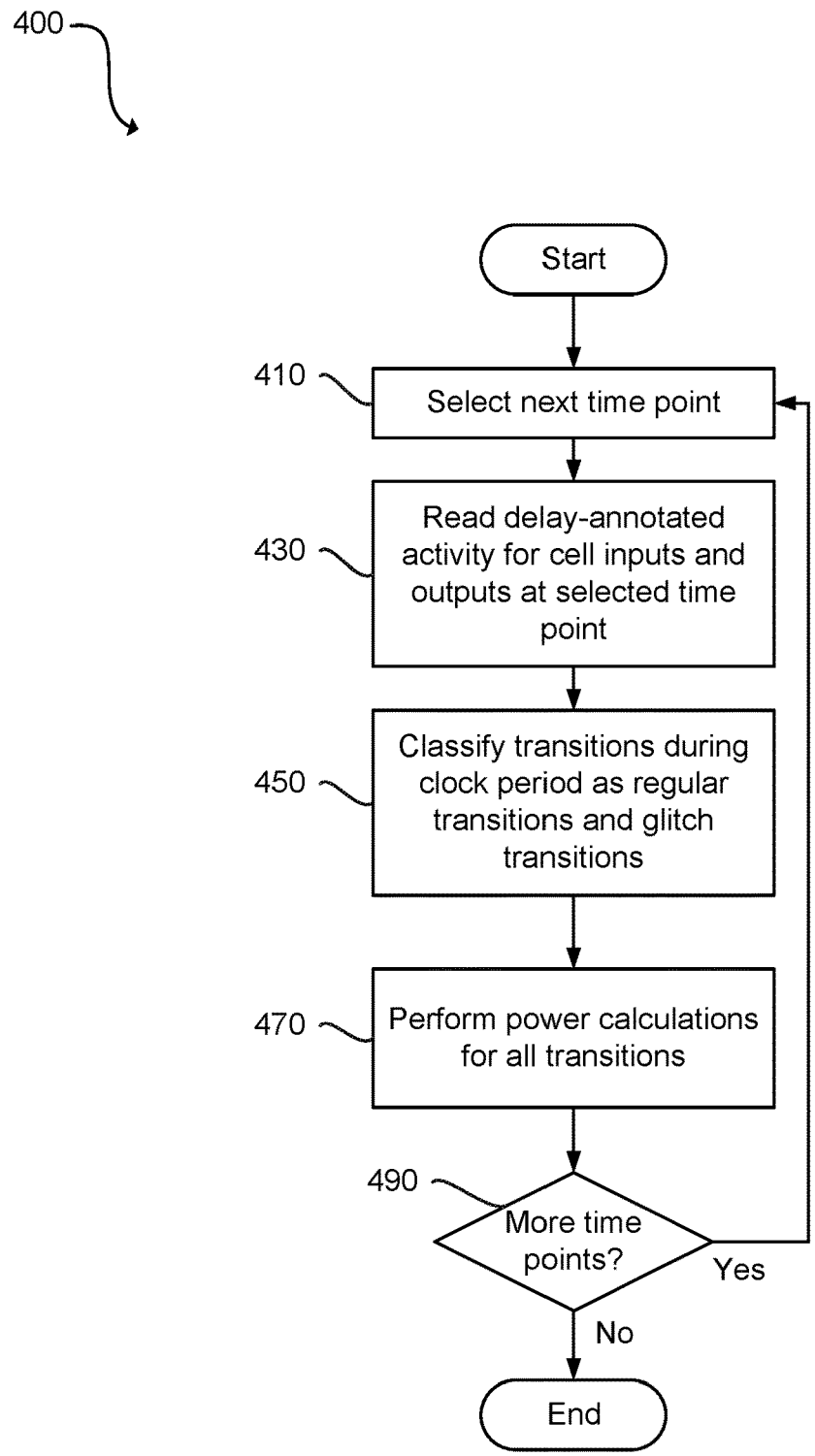
FIG. 4 is a flowchart of a method for performing power analysis based on a delay-annotated simulation vector according to one embodiment of the present disclosure.

FIG. 4 is a flowchart of a method 400 for performing power analysis based on a delay-annotated simulation vector according to one embodiment of the present disclosure. In some embodiments, the method 400 of FIG. 4 is performed to implement the power analysis based on a delay-annotated simulation vector at 370 of FIG. 3. For the sake of explanation, the method 400 will be described in the context of considering a single cell. However, the method 400 can be similarly applied to all of the cells in the integrated circuit design (e.g., performed in parallel across multiple threads executing on one or more cores of one or more processors) to compute the estimated power consumption of the entire integrated circuit design based on the delay-annotated simulation vector.

At 410, the power analysis tool 210 selects a next time point for analysis. In some embodiments, the next time point may correspond to the start of a given clock period or clock cycle of the domain clock associated with the current pin, where a next transition of the domain clock is used to identify the end of the given clock period or clock cycle. At 430, the power analysis tool 210 reads the delay-annotated activity (transitions) for the inputs to the cell and corresponding outputs of the cell at the selected time point. At 450, the power analysis tool 210 classifies the events (transitions) (e.g., at the outputs of the cell) in the given clock cycle as regular transitions and/or as glitch transitions, as described in more detail below with respect to FIG. 5A and FIG. 5B.

At 470, the power analysis tool 210 performs power calculations for all of the transitions, based on the empirically derived power consumption information associated with the cell (e.g., power consumed when performing transitions based on particular corresponding changes inputs to the cell). In particular, various combinations of changes in input events (transitions at input pins) and changes in output events (transitions at output pins) may be associated with different power consumption (e.g., based on which transitions within the cell switch), and therefore the power consumption of regular transitions and transport glitch (TG) transitions are calculated accordingly. Inertial glitches, due to their durations, may consume less power due to their brief durations, and therefore in some embodiments, the estimated power consumed by an inertial glitch is de-rated by multiplying the power associated with a corresponding full transition by a derating factor or glitch scaling ratio gr. In some embodiments, the derating factor or the glitch scaling ratio gr is calculated in accordance with: gr=(pulse width/average slew) 2.

At 490, the power analysis tool 210 determines if there are more time points to analyze (e.g., additional clock cycles of the input delay-annotated simulation vector). If there are more time points to analyze, then the power analysis tool 210 continues by selecting the next time point at 410. If there are no additional time points to analyze, then the process ends, e.g., by outputting the power calculations that were performed for all of the transitions across all of the time points, where the results are provided to generate outputs as described in FIG. 3.

Figure 5A:
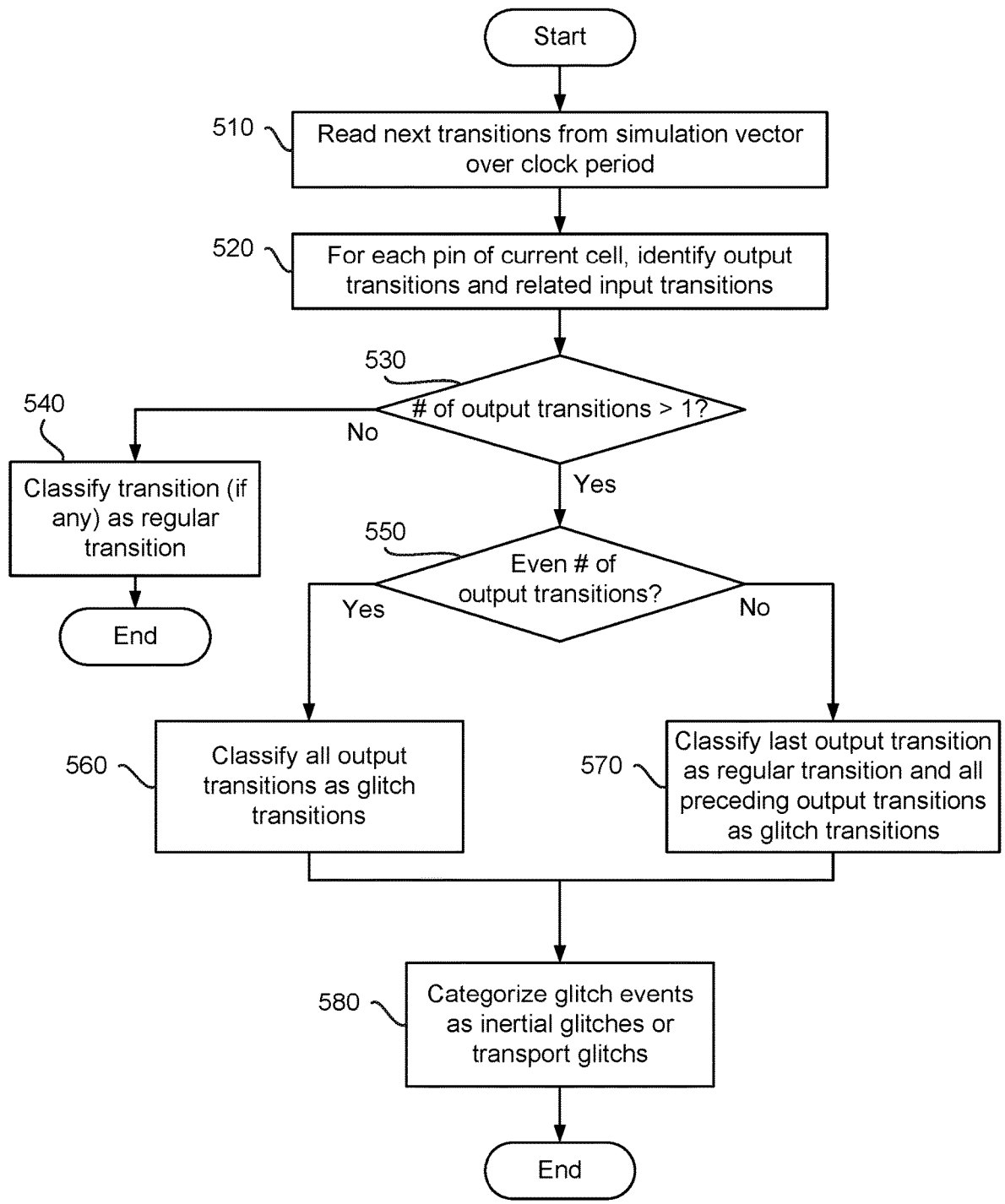
FIG. 5A is a flowchart of a method for performing transition categorization according to one embodiment of the present disclosure.

FIG. 5A is a flowchart of a method 500 for performing transition categorization according to one embodiment of the present disclosure. In some embodiments, the power analysis tool 210 applies the method 500 for performing transition categorization to classify or categorize transitions during a given clock period as regular transitions or as glitch transitions at 450 of method 400 shown in FIG. 4. As shown in FIG. 5A, at 510, the power analysis tool 210 reads the next events (transitions) over (or occurring during) the current clock period (or current clock cycle). At 520, the power analysis tool 210 identifies, for each pin of the current cell, output events (transitions in the output signal or signals) and related input events (transitions in the input signals). The glitch power analysis described herein assumes that the integrated circuit design satisfies a timing constraint where all cells settle at their designed or intended output values before the end of each clock cycle, such that the correct or intended values are read by downstream cells during subsequent clock cycles.

At 530, the power analysis tool 210 determines whether a count of output transitions (e.g., the number of output transitions) occurring during the clock period was greater than 1. If not, then there were no glitch transitions during the clock period, because either there were no transitions (0 transitions), in which case the output signal did not change at all, or there was one transition, where the output signal changed from low to high or from high to low, and where it is assumed that the final output value at the end of the clock period is the designed and intended output of the cell. At 540, the power analysis tool 210 classifies the event or transition (if there was an event or transition), as a regular transition (e.g., a regular, non-glitch event), and the process ends for the analysis of the current cell for the current clock period.

In a case where the power analysis tool 210 determines that the count of output transitions was greater than 1, then at 540, the power analysis tool 210 determines if there was an even number of output transitions. If so, then at 560, the power analysis tool 210 classifies all of the output transitions as glitch transitions because an even number of transitions means that the output signal at the end of the clock period is the same as it was at the beginning of the clock period and therefore all of the transitions were undesired glitches. On the other hand, if there was an odd number of glitches, then at 570, the power analysis tool 210 classifies the last output transition (e.g., having latest timestamp) as a regular transition (e.g., the intended final transition, referring back to the assumption stated above that all cells in the design settle to their intended states by the end of each clock cycle), and classifies all of the preceding output transitions as glitch transitions. At 580, the power analysis tool 210 categorizes the glitch transitions as either inertial glitches or transport glitches, one example of which is described in more detail below with respect to FIG. 5B.

Figure 5B:
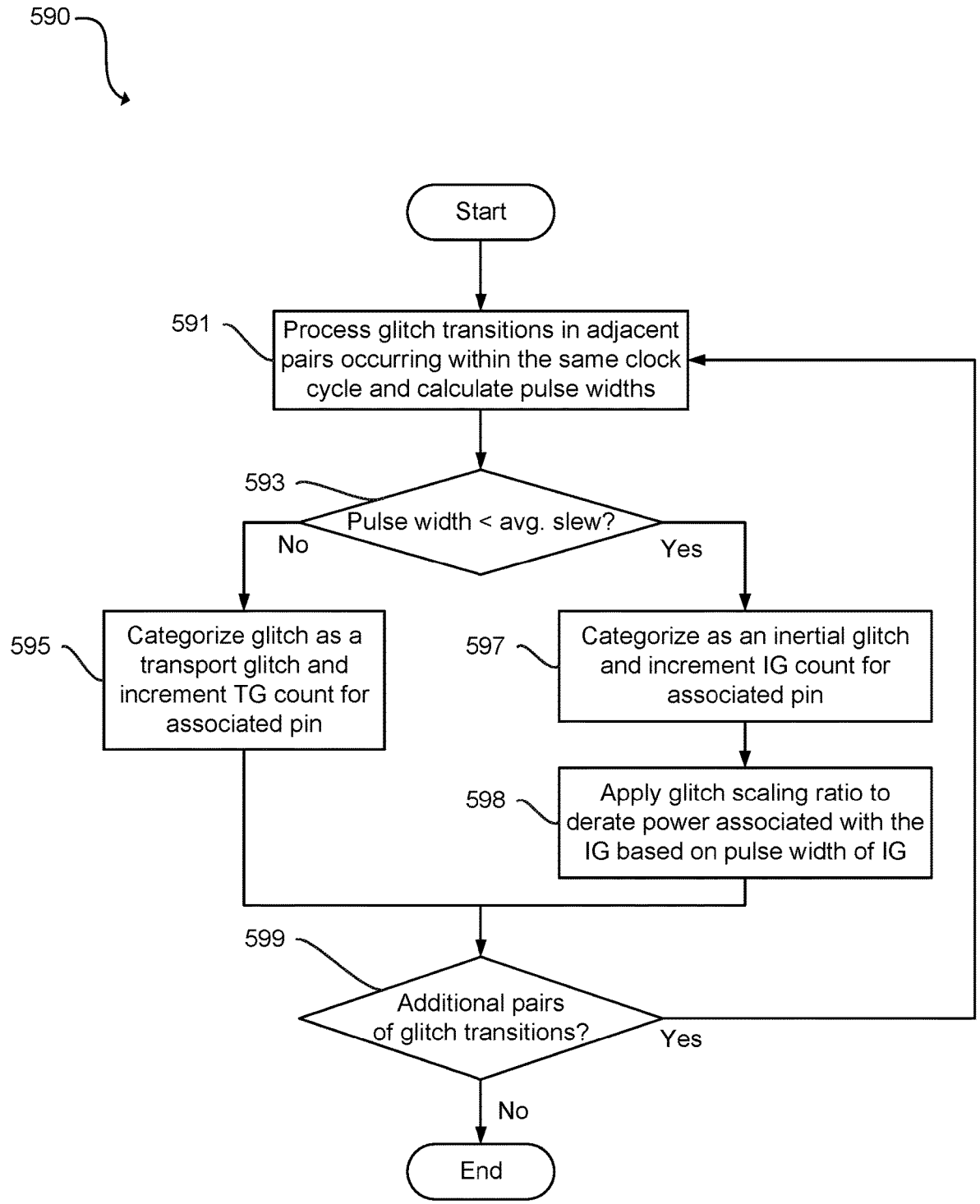
FIG. 5B is a flowchart of a method for categorizing glitch transitions as inertial glitches or transport glitches according to one embodiment of the present disclosure.

FIG. 5B is a flowchart of a method 590 for categorizing glitch transitions as inertial glitches or transport glitches according to one embodiment of the present disclosure. Generally, the method 590 classifies glitches as inertial glitches versus transport glitches based on the pulse width of the glitches, where the average slew (e.g., the average of the output rise time and the output fall time) of the cell is used as a threshold for classifying the glitches. At 591, the power analysis tool 210 processes glitch transitions in adjacent pairs (e.g., consecutive pairs) occurring within the same clock cycle and calculates the pulse widths by computing the difference between the timestamps of the two glitch transitions.

At 593, the power analysis tool 210 determines whether the pulse width of the glitch is smaller than the average slew of the cell. If not, then at 595, the power analysis tool 210 categorizes the glitch as a transport glitch (TG), and increments a TG count for the associated output pin. The glitch is categorized as a transport glitch when the pulse width is greater than the average slew because the glitch is sufficiently long for the signal to completely transition to the other logic value and back (e.g., 0→1→0 or 1→0→1).

On the other hand, in circumstances where the power analysis tool 210 determines that the pulse width is greater than or equal to the average slew, then, at 597, the power analysis tool 210 categorizes the glitch as an inertial glitch and increments an IG count for the associated output pin. At 598, the power analysis tool 210 also applies a glitch scaling ratio to de-rate the power associated with In some aspects, the glitch scaling ratio is based on the pulse width and slew. In some aspects, the glitch scaling ratio gr is equal to gr=(pulse width/average slew) 2. For example, the power determined at 470 of FIG. 4 for the transitions classified as inertial glitches is multiplied by the glitch scaling ratio to obtain the power associated with the inertial glitch.

At 599, the power analysis tool 210 determines whether there are additional pairs of glitch transitions to consider. If so, then the power analysis tool 210 returns with selecting the next pair of glitch transitions at 591. Otherwise, the method 590 ends, having categorized the glitch transitions detected for the current clock period for the current cell.

Referring back to FIG. 3, in the case where the simulation vector is a zero-delay simulation vector, the power analysis tool 210 performs power analysis on a zero-delay simulation vector, which does not include any delay and therefore the signals are aligned with a clock signal of the circuit. Because all of the signals are aligned with the clock signal, the zero-delay simulation vector is assumed to be free of glitches. Accordingly, some aspects relate to shifting a given input zero-delay simulation vector to simulate the effect of delays in order to generate potential glitches arising from the delays of signals and to compute an estimated glitch power.

In particular, some aspects of the present disclosure relate to generating shifted waveforms based on high-quality static timing analysis (STA) timing data. The shifted waveforms may be used to identify which nets have glitches and the number of glitches. The number of glitches in each net may be a function of the number of propagated glitches as described further below. The shifted waveforms may also be used to filter data to understand the severity based on glitch duration and power consumption, and remove glitches and recover power through engineering change order (ECO) cell re-sizing and buffer insertion.

In some embodiments, STA timing data for various nodes of a target circuit design are generated for a given circuit design using vector waveforms. As discussed above with respect to FIG. 2, the STA timing data may be updated through various stages of the design flow 200, where increasing detail regarding the placement of cells and the routing of signals between the cells provides additional STA timing data that may be used to by the power analysis tool 210 to generate shifted waveforms and to simulate the timing and presence of glitches based on an RTL simulation vector. The simulation vector waveforms may be generated using a high-level (e.g., RTL or gate-level) simulation process. Next, the operation of sensitized signal paths are simulated using a modified RTL simulation process in which data signals are chronologically incrementally shifted in accordance with the STA timing data. In some aspects, data signals are generated and incrementally and chronologically propagated along corresponding branches of each sensitized signal path of the circuit design (e.g., the instantaneous "location" of transmitted data signals along their corresponding signal paths is determined for each timestamp/moment). When a given data signal encounters a logic gate or other delay-producing element disposed in its associated signal path, propagation of the data signal through the gate/element/cell is determined by its associated STA timing data. Thus, the zero-delay vector waveforms are shifted using the STA timing data. This activity delay shifting process utilizes readily available zero-delay vectors from simulation (e.g., RTL, gate-level) and then shifts the waveform for each and every signal based on delay information provided by gate-level static timing analysis (STA). The resulting vectors provide sufficient accuracy to identify glitches and glitch power much earlier in the design process, without waiting for full gate level SDF simulations to be available.

Figure 6:
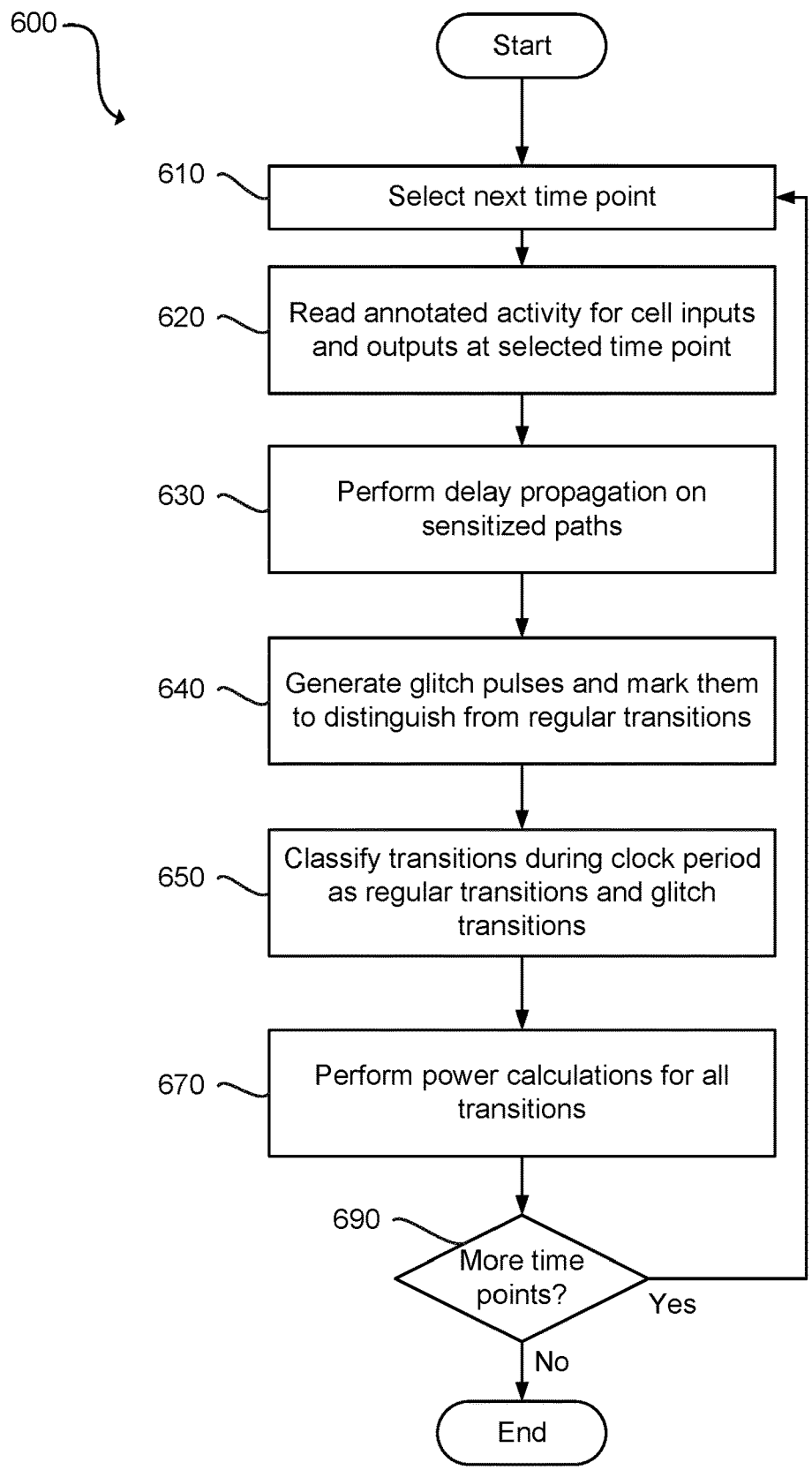
FIG. 6 is a flowchart of a method for performing power analysis based on a zero-delay simulation vector according to one embodiment of the present disclosure.

FIG. 6 is a flowchart of a method 600 for performing power analysis based on a zero-delay simulation vector according to one embodiment of the present disclosure. This may occur, for example, in the case where the power analysis tool 210 receives an initial RTL simulation vector (e.g., a value change dump (VCD) file or fast signal database (FSDB) file) generated during a zero-delay or RTL simulation performed on the netlist. For the sake of explanation, in a manner similar to that above with respect to FIG. 4, the method 380 will be described in the context of considering a single cell. However, the method 380 can be similarly applied to all of the cells in the integrated circuit design (e.g., performed in parallel across multiple threads executing on one or more cores of one or more processors) to compute the estimated power consumption of the entire integrated circuit design based on the zero-delay simulation vector.

At 610, the power analysis tool 210 selects a next time point for analysis. In some embodiments, the next time point may correspond to a next clock period of the domain clock associated with the current pin. At 620, the power analysis tool 210 reads the annotated activity for the inputs to the cell and corresponding outputs of the cell at the selected time point.

At 630, the power analysis tool 210 performs delay propagation for a time point in the RTL vector file based on sensitized paths and the timing data. Delays are determined for every node (e.g., cells, nets, pins) of the circuit design. The circuit design is levelized as further described in FIG. 7. Primary inputs and register outputs are annotated in the RTL vector file. For example, if a register drives a cell A, starting from the register all events (arriving) for cell A are determined. Based on the arrival signal of each event, logical simulation is performed to propagate each event to the output. A timing arc defines the propagation of signals through logic gates and nets and defines a timing relationship between two related pins. The delay propagation is based on an arc delay associated with the logic gates (cell arc delay) and nets (net arc delay) between the two related pins. The propagation is repeated for each level. For example, if the cell A drives a cell B, then the delay in the output of cell A is propagated to the corresponding input to cell B in accordance with the net arc delay between the two pins.

At 640, the power analysis tool 210 performs glitch generation and propagation to generate glitch events. The glitch generation and propagation is performed using the delays determined at 630. In some aspects, the glitch generation and propagation may be performed using the method shown and described in FIG. 7.

At 650, the power analysis tool 210 classifies transitions occurring during each clock period as regular transitions and glitch transitions, for example, based on the number of transitions occurring during the clock period, and glitch transitions may be further categorized as transport glitches (TG) or inertial glitches (IG). In some embodiments, the classifying of the transitions is performed using the method 500 shown and described in FIG. 5A and FIG. 5B.

At 670, the power analysis tool 210 performs power calculations for all of the transitions, based on the empirically derived power consumption information associated with the cell (e.g., power consumed when performing transitions based on particular corresponding changes inputs to the cell). In particular, various combinations of changes in input events (transitions at input pins) and changes in output events (transitions at output pins) may be associated with different power consumption (e.g., based on which transitions within the cell switch), and therefore the power consumption of regular transitions and transport glitch (TG) transitions are calculated accordingly. Inertial glitches, due to their durations, may consume less power due to their brief durations, and therefore in some embodiments, the estimated power consumed by an inertial glitch is de-rated by multiplying the power associated with a corresponding full transition by a derating factor or glitch scaling ratio gr. In some embodiments, the derating factor or the glitch scaling ratio gr is calculated in accordance with: gr=(pulse width/average slew) 2.

At 690, the power analysis tool 210 determines if there are more time points to analyze (e.g., additional clock cycles of the input delay-annotated simulation vector). If there are more time points to analyze, then the power analysis tool 210 returns to selecting the next time point at 610. If there are no additional time points to analyze, then the process ends, e.g., by outputting the power calculations that were performed for all of the transitions across all of the time points, where the results are provided to generate outputs as described in FIG. 3.

Figure 7:
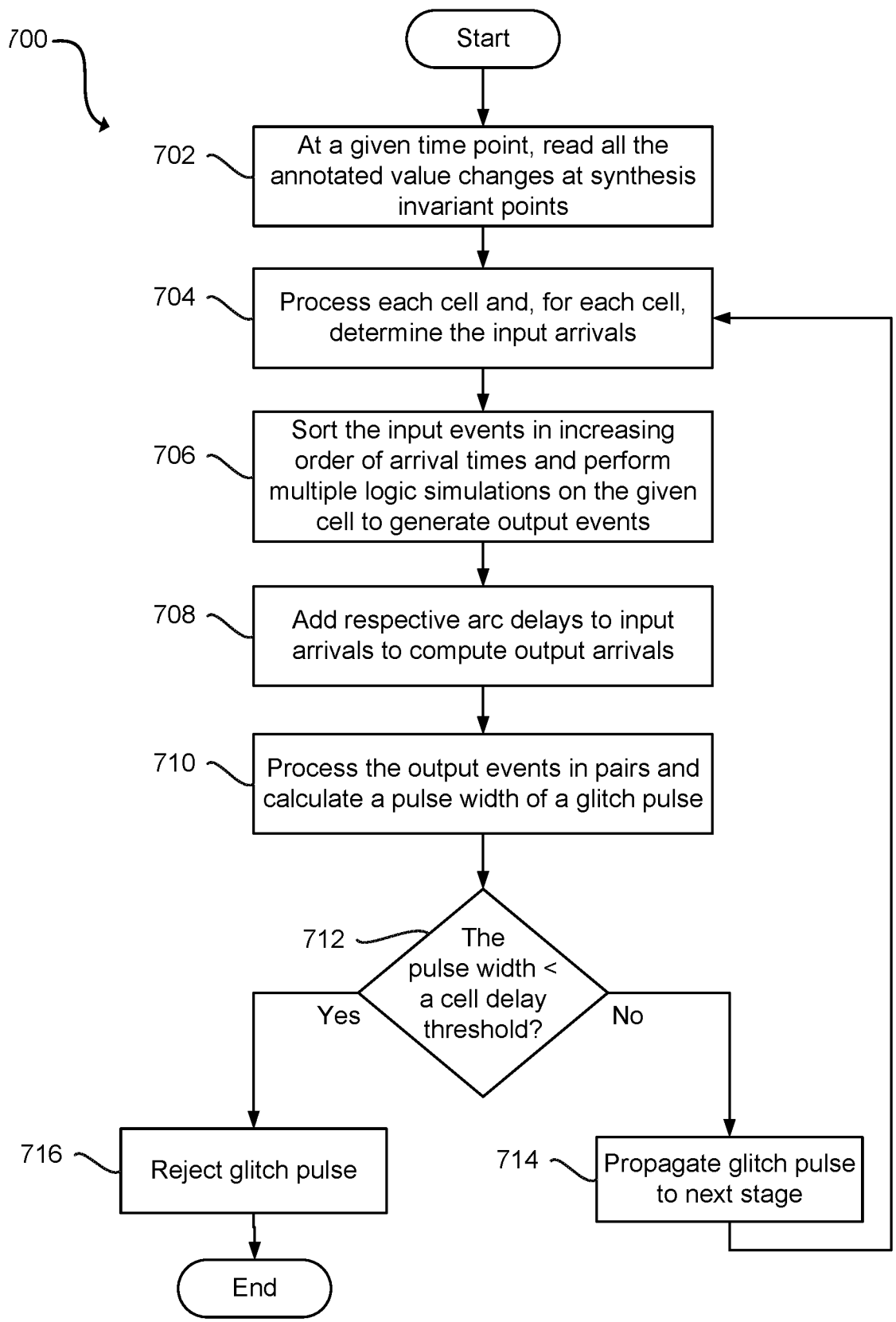
FIG. 7 is a flowchart of a method for glitch propagation, in accordance with an embodiment of the present disclosure.

FIG. 7 illustrates a flowchart of a method 700 for glitch propagation of a glitch, in accordance with an embodiment of the present disclosure. During the simulation/propagate stage (e.g., at step 630 of FIG. 6), the power analysis tool 210 generates glitch events (due to the timing delays) and propagates the glitch events through the design. Arrival times are calculated for these glitch events. Glitch propagation is expected to happen on the combinational paths only, accordingly a propagation process for a glitch may stop upon reaching a cell that is not a combinational cell (e.g., a sequential cell). The method 700 described herein relates to propagating a single glitch, but, as would be understood, the method may be repeated herein to generate multiple glitches for power analysis in accordance with the design of the circuit.

At 702, the power analysis tool 210 reads annotated value changes at synthesis invariant points for a given time point. At 704, the power analysis tool 210 determines input arrivals for each cell. In some embodiments, each cell is processed in topologically sorted order or an order that preserves the logical relationships between the outputs of upstream cells and the inputs of downstream cells.

At 706, the power analysis tool 210 sorts the input events (e.g., for the delays) based on arrival times. In some embodiments, the input events are sorted in an increasing order of the arrival times. Output events are generated for a given cell by performing multiple logic simulations (e.g., simulating the behavior of the cell in accordance with its description). In some aspects, the output events include glitches and regular toggles.

At 708, the power analysis tool 210 adds arc delays to respective input arrivals to determine output arrivals. For example, an AND gate may have input A, input B, and output Y. If input A causes a toggle on the output signal Y of the AND gate, then the arrival time of Y is a function of the arc delay associated with the cell arc between Y and A and the arrival time of input A.

At 710, the power analysis tool 210 processes the output events in pairs. A pulse width is determined for a glitch pulse (for two output events). At 712, a determination is made to whether the pulse width is less than a cell delay threshold. In response to determining that the pulse width is less than the cell delay threshold, the glitch pulse is rejected and is not propagated. In response to determining that the pulse width is greater than the cell delay threshold, the power analysis tool 210 proceeds to 714. At 714, the power analysis tool 210 propagates the glitch pulse to a next stage and the process proceeds to step 704. In some embodiments, the cell delay threshold may depend on the arc delays of the cell (e.g., an average delay value and/or a maximum delay value). Further, the cell delay threshold may be a glitch filter ratio. In some aspects, the glitch filter ratio may be a percentage of the cell delay. For example, a glitch filter ratio may be used with a default value of 50% (i.e., pulses with pulse width less than 50% of cell delay are not be propagated to the cell output). The glitch filter ratio may be configured by the user. Additionally, or alternatively, the glitch filter ratio may be automatically adjusted based on experimental results or a desired level of accuracy. At 716, the glitch pulse is rejected and is not propagated.

Accordingly, embodiments of the present disclosure relate to techniques for efficiently computing estimated glitch power based on simulation vectors, where the simulation vectors may be delay-annotated simulation vectors or zero-delay simulation vectors. Aspects of the present disclosure greatly shorten power analysis runtime for computing glitch power in comparison to other techniques, thereby improving the ability of IC designers to detect and modify the IC designs to reduce wasted power associated with glitches. In particular, some embodiments relate to a power analysis tool that provides glitch power analysis information at various stages of an integrated circuit design flow, where the glitch power analysis uses delay information from the current stage of the design flow to generate more accurate estimates of glitch power associated with the current design, thereby allowing IC designers to modify the IC design at the current stage to reduce (or eliminate) glitches, thereby reducing (or eliminating) glitch power.

An embodiment of the present disclosure was tested on a large integrated circuit design having approximately 5 million instances (e.g., gates) based on applying delay shifting to a zero delay simulation vector, categorizing the glitches on a per-cycle basis as described above and calculating the power consumed by the glitches resulted in an estimated glitch power of 0.174 Watts.

In comparison, two simulation runs were performed (using the same inputs from a simulation test bench), once with zero delays to generate a zero delay simulation vector and once with delays accounted for to generate a delay annotated simulation vector. The calculated total power consumption based on the zero delay simulation vector was 0.8769 Watts and the calculated total power consumption based on the delay-annotated simulation vector was 1.0646 Watts. The difference in these two power consumption values represents the glitch power. As a result, the state of the art best estimate of glitch power consumed by this design is 1.0646 Watts−0.8769 Watts=0.1877 Watts. However, this approach has a large runtime overhead, at least because performing power analysis on large simulation vectors typically requires several days or weeks for both runs to complete.

Therefore, embodiments of the present disclosure provide good correlation (within around 7%) of the state of the art calculation, with substantially reduced runtime compared to an approach involving performing two simulation runs to generate both a zero delay simulation run and a delay annotated simulation vector.

Figure 8:
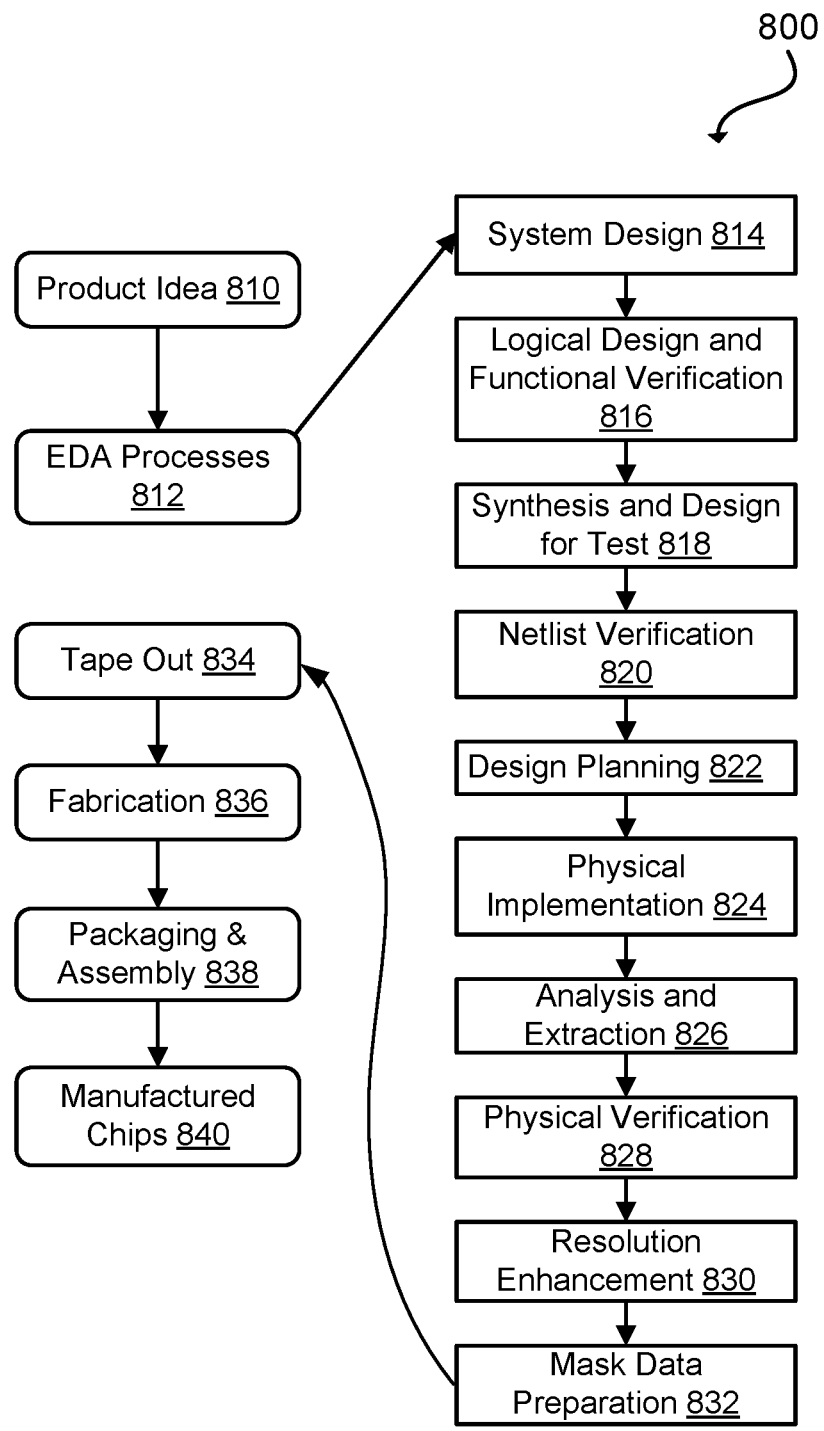
FIG. 8 depicts a flowchart of various processes used during the design and manufacture of an integrated circuit in accordance with some embodiments of the present disclosure.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or Open Vera. The HDL description can be transformed to a logic-level register-transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 8. The processes described by be enabled by EDA products (or EDA systems).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
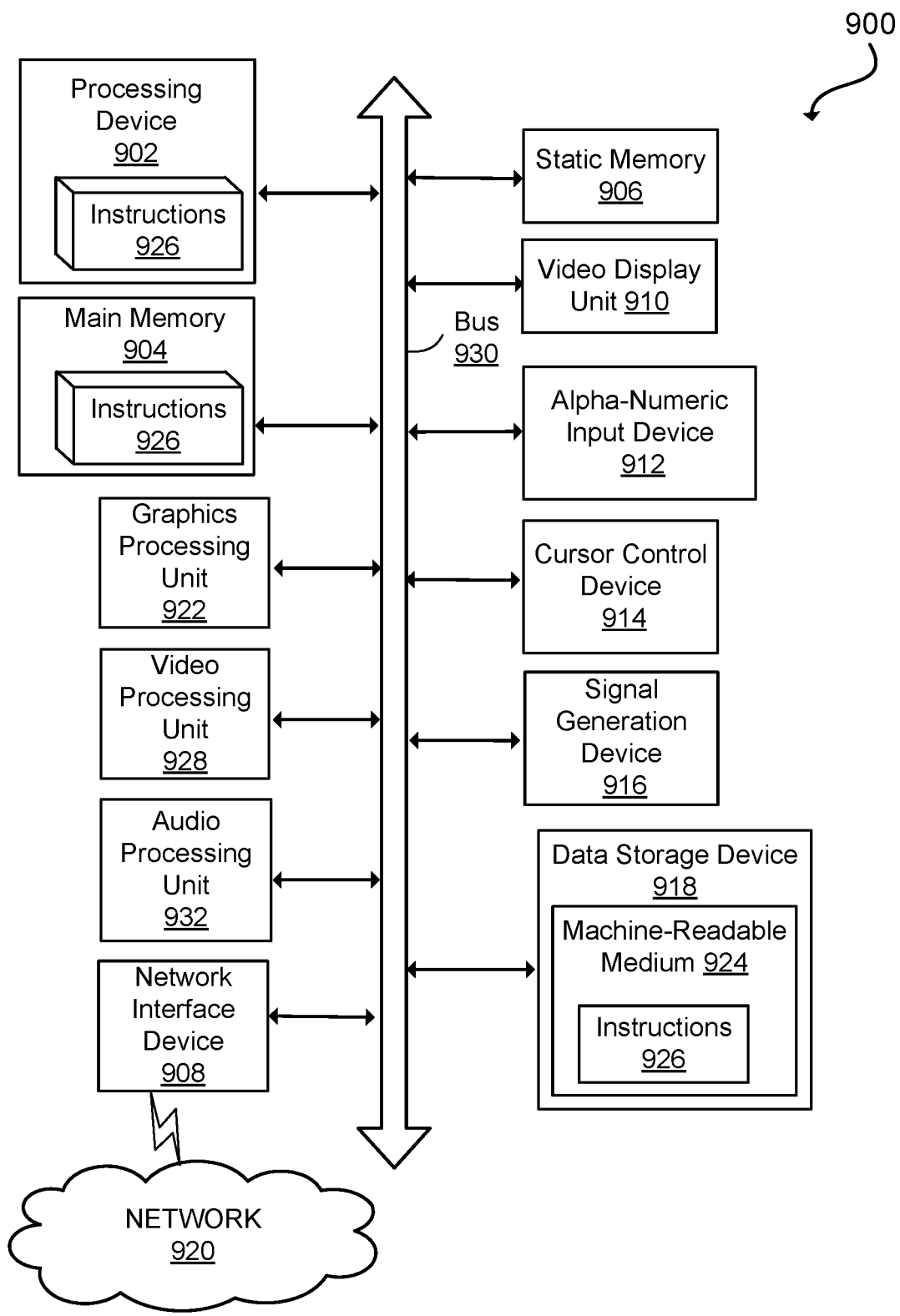
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
receiving a simulation vector associated with a circuit design, wherein the simulation vector is associated with a simulation vector type;
identifying, by a processor, a plurality of glitch transitions from among one or more transitions associated with a pin of a cell of the circuit design during a clock period of the simulation vector; and
determining a glitch power consumption of the cell during the clock period based on the plurality of glitch transitions.

2. The method of claim 1, wherein the identifying the plurality of glitch transitions comprises:
determining that the one or more transitions associated with the pin of the cell comprises the plurality of glitch transitions when a count of the one or more transitions is greater than 1;
identifying all of the one or more transitions as the plurality of glitch transitions when the count of the one or more transitions is even; and
identifying all but a last transition as the plurality of glitch transitions when the count of the one or more transitions is odd.

3. The method of claim 1, further comprising categorizing the plurality of glitch transitions by:
selecting a pair of adjacent glitch transitions from among the plurality of glitch transitions in order of timestamp;
computing a pulse width based on a difference between timestamps of the pair of adjacent glitch transitions;
categorizing a glitch associated with the pair of adjacent glitch transitions as a transport glitch when the pulse width is greater than or equal to an average slew of the cell; and
categorizing the glitch associated with the pair of adjacent glitch transitions as an inertial glitch when the pulse width is less than the average slew of the cell.

4. The method of claim 3, wherein the computing the glitch power consumption comprises computing a glitch power of the inertial glitch by derating a power associated with a regular transition of the cell by a glitch scaling ratio computed in accordance with squaring a quotient of the pulse width divided by the average slew of the cell.

5. The method of claim 1, wherein the simulation vector type is a zero-delay simulation vector, and
wherein the method further comprises:
performing a timing update to determine timing information for the circuit design, where the timing information includes a signal delay associated with a cell of the circuit design; and
shifting a plurality of signals of the simulation vector based on the timing information to simulate delays in the plurality of signals of the simulation vector.

6. The method of claim 5, wherein the shifting the signals of the simulation vector comprises propagating a glitch through the simulation vector based on an arc delay associated with the cell of the circuit design.

7. The method of claim 1, further comprising identifying a clock domain of the cell and a domain clock signal associated with the clock domain from among a plurality of signals of the simulation vector, and
determining the clock period based on the domain clock signal.

8. A system comprising:
a memory storing instructions; and
a processor, coupled with the memory and to execute the instructions, the instructions when executed cause the processor to:
receive a simulation vector associated with a circuit design, the simulation vector being generated by a simulator simulating the circuit design;
receive static timing analysis (STA) timing information of the circuit design;
shift a plurality of signals of the simulation vector based on the STA timing information;
identify a plurality of glitch transitions from among one or more transitions associated with a pin of a cell of the circuit design during a clock period of the simulation vector; and
compute a glitch power consumption of the cell during the clock period based on the plurality of glitch transitions.

9. The system of claim 8, wherein the instructions further comprise instructions that, when executed, cause the processor to identify the plurality of glitch transitions by:
determining that the one or more transitions associated with the pin of the cell comprises the plurality of glitch transitions when a count of the one or more transitions is greater than 1;
identifying all of the one or more transitions as the plurality of glitch transitions when the count of the one or more transitions is even; and
identifying all but a last transition as the plurality of glitch transitions when the count of the one or more transitions is odd.

10. The system of claim 8, wherein the instructions further comprise instructions that, when executed, cause the processor to categorize the plurality of glitch transitions by:
selecting a pair of adjacent glitch transitions from among the plurality of glitch transitions in order of timestamp;
computing a pulse width based on a difference between timestamps of the pair of adjacent glitch transitions;
categorizing a glitch associated with the pair of adjacent glitch transitions as a transport glitch when the pulse width is greater than or equal to an average slew of the cell; and
categorizing the glitch associated with the pair of adjacent glitch transitions as an inertial glitch when the pulse width is less than the average slew of the cell.

11. The system of claim 10, wherein the instructions further comprise instructions that, when executed, cause the processor to compute a glitch power of the inertial glitch by derating a power associated with a regular transition of the cell by a glitch scaling ratio computed in accordance with squaring a quotient of the pulse width divided by the average slew of the cell.

12. The system of claim 8, wherein the instructions to shift the plurality of signals of the simulation vector based on the STA timing information comprise instructions that, when executed by the processor, cause the processor to propagate a glitch through the simulation vector based on the STA timing information.

13. The system of claim 8, wherein the STA timing information is received from a placement stage, a routing stage, or a signoff stage of a design flow of the circuit design.

14. The system of claim 8, wherein the instructions further comprise instructions that, when executed, cause the processor to generate feedback to a design flow of the circuit design as glitch-aware gate level switch activity interface format data or as glitch aware fast switching database format data.

15. A non-transitory computer readable medium comprising stored instructions, which when executed by a processor, cause the processor to:
receive a simulation vector associated with a circuit design, wherein the simulation vector is associated with a simulation vector type;
identify a plurality of glitch transitions from among one or more transitions associated with a pin of a cell of the circuit design during a clock period of the simulation vector; and
determine a glitch power consumption of the cell during the clock period based on the plurality of glitch transitions.

16. The non-transitory computer readable medium of claim 15, wherein the stored instructions further comprise instructions, which when executed by the processor, cause the processor to identify the plurality of glitch transitions by:
determining that the one or more transitions associated with the pin of the cell comprises the plurality of glitch transitions when a count of the one or more transitions is greater than 1;
identifying all of the one or more transitions as the plurality of glitch transitions when the count of the one or more transitions is even; and
identifying all but a last transition as the plurality of glitch transitions when the count of the one or more transitions is odd.

17. The non-transitory computer readable medium of claim 15, wherein the stored instructions further comprise instructions, which when executed by the processor, cause the processor to categorize the plurality of glitch transitions by:
selecting a pair of adjacent glitch transitions from among the plurality of glitch transitions in order of timestamp;
computing a pulse width based on a difference between timestamps of the pair of adjacent glitch transitions;
categorizing a glitch associated with the pair of adjacent glitch transitions as a transport glitch when the pulse width is greater than or equal to an average slew of the cell; and
categorizing the glitch associated with the pair of adjacent glitch transitions as an inertial glitch when the pulse width is less than the average slew of the cell.

18. The non-transitory computer readable medium of claim 17, wherein the stored instructions further comprise instructions, which when executed by the processor, cause the processor to compute a glitch power of the inertial glitch by derating a power associated with a regular transition of the cell by a glitch scaling ratio computed in accordance with squaring a quotient of the pulse width divided by the average slew of the cell.

19. The non-transitory computer readable medium of claim 15, wherein the stored instructions further comprise instructions, which when executed by the processor, cause the processor to:
determine the simulation vector type is a zero-delay simulation vector;
perform a timing update to determine timing information for the circuit design, where the timing information includes a signal delay associated with a cell of the circuit design; and
shift a plurality of signals of the simulation vector based on the timing information to simulate delays in the plurality of signals of the simulation vector.

20. The non-transitory computer readable medium of claim 15, wherein the stored instructions further comprise instructions, which when executed by the processor, cause the processor to generate feedback to a design flow of the circuit design as glitch-aware gate level switch activity interface format data or as glitch aware fast switching database format data.

* * * * *